United States Patent [19]
Radcliffe

[11] Patent Number: 5,377,033
[45] Date of Patent: Dec. 27, 1994

[54] FERROELECTRIC LIQUID CRYSTAL DEVICE WITH AN ORGANOSILESQUIOXANE ALIGNMENT LAYER AND A POLYAMIDE OR POLYESTER ALIGNMENT LAYER

[75] Inventor: Marc D. Radcliffe, Woodbury, Minn.
[73] Assignee: Minnesota Mining and Manufacturing Company, St. Paul, Minn.
[21] Appl. No.: 181,363
[22] Filed: Jan. 13, 1994

Related U.S. Application Data

[63] Continuation of Ser. No. 916,169, Jul. 17, 1992, abandoned.
[51] Int. Cl.$^5$ .............................. G02F 1/1337
[52] U.S. Cl. ............................ 359/75; 359/78; 359/103; 359/104
[58] Field of Search ................. 359/75, 76, 77, 78, 359/103, 104

[56] References Cited

U.S. PATENT DOCUMENTS

| | | | |
|---|---|---|---|
| 4,273,420 | 6/1981 | Watanabe et al. | 359/76 |
| 4,367,924 | 1/1983 | Clark et al. | 359/56 |
| 4,561,726 | 12/1985 | Goodby et al. | 359/75 |
| 4,563,059 | 1/1986 | Clark et al. | 359/76 |
| 4,867,903 | 9/1989 | Nohira et al. | 359/104 |
| 4,882,207 | 11/1989 | Coates et al. | 428/1 |
| 4,886,619 | 12/1989 | Janulis | 252/299 |
| 4,902,106 | 2/1990 | Dijon et al. | 359/75 |
| 4,917,821 | 4/1990 | Mori et al. | 359/104 |
| 5,062,691 | 11/1991 | Tristani-Kendra et al. | 359/56 |
| 5,082,587 | 1/1992 | Janulis | 252/299 |
| 5,091,109 | 2/1992 | Takiguchi et al. | 359/104 |
| 5,109,293 | 4/1992 | Matsunaga et al. | 359/76 |

FOREIGN PATENT DOCUMENTS

| | | |
|---|---|---|
| 0450549A1 | of 0000 | European Pat. Off. |
| 61-129624 | 6/1986 | Japan |
| 0050731 | 3/1987 | Japan |
| 0297818 | 12/1987 | Japan |
| 0211724 | 8/1989 | Japan |

OTHER PUBLICATIONS

Marshal, Kenneth L., "Laser Damage Resistant Polysiloxane Polymers as Homeotropic Alignment Layers for Liquid Crystal Devices," Mol. Cryst. Liq. Cryst. Letters, vol. (5), pp. 133–138, 1986.

Patel, J. S., and Goodby, J. W., "Alignment of Liquid Crystals Which Exhibit Cholesteric to Smectic C* Phase Transitions," J. Appl. Phys., vol. 59(7), Apr. 1, 1986.

Geary, J. M., Goodby, J. W., Kmetz, A. R., and Patel, J. S., "The Mechanism of Polymer Alighnment of Liquid-Crystal Materials," J. Applied Phys., vol. 62(10), Nov. 15, 1987.

Bawa, S. S., Biradar, A. M., Saxena, K., and Chandra, S., "Novel Alignment Technique for Surface Stabilized Ferroelectric Liquid Crystal," Appl. Phys. Lett., vol. 57(14) Oct. 1, 1990.

Orihara, H., Suzuki, A., Isyhibashi, Y., Gouhara, K., Yamada, Y., and Yamamoto, N., "Effect of a Polyamide Coat on the Layer Structure in a Surface-Stabilized Ferroelectric Liquid Crystal Cell," Japanese Journal of Applied Physics, vol. 28, No. 4, Apr. 1989, pp. L 676-L 678.

Patel, J. S., Leslie, T. M., and Goodby, J. W., "A Reliable Method of Alignment for Smectic Liquid Crystals," Ferroelectrics, vol. 59 (1984) pp. 137–144.

Primary Examiner—William L. Sikes
Assistant Examiner—Kenneth Parker
Attorney, Agent, or Firm—Walter N. Kirn; Carole Truesdale

[57] ABSTRACT

A bistable ferroelectric liquid crystal display device is provided. The device comprises a first substrate, a second substrate opposed to said first substrate, said substrates disposed to provide a non-helicoidal alignment of the ferroelectric liquid crystal material and electrodes on said substrates to define one or a plurality of pixels, said electrode bearing first substrate having an aliphatic polyamide or polyester alignment coating thereon and said electrode bearing second substrate having an organosilsesquioxane polymer coating thereon, and a ferroelectric liquid crystal mixture comprising compounds having fluorinated tail portions with multiple $CF_2$ groups disposed between said substrates with the proviso that at least one of said substrates is transparent. Also provided is a method for providing an aligned ferroelectric liquid crystal display device.

12 Claims, 1 Drawing Sheet

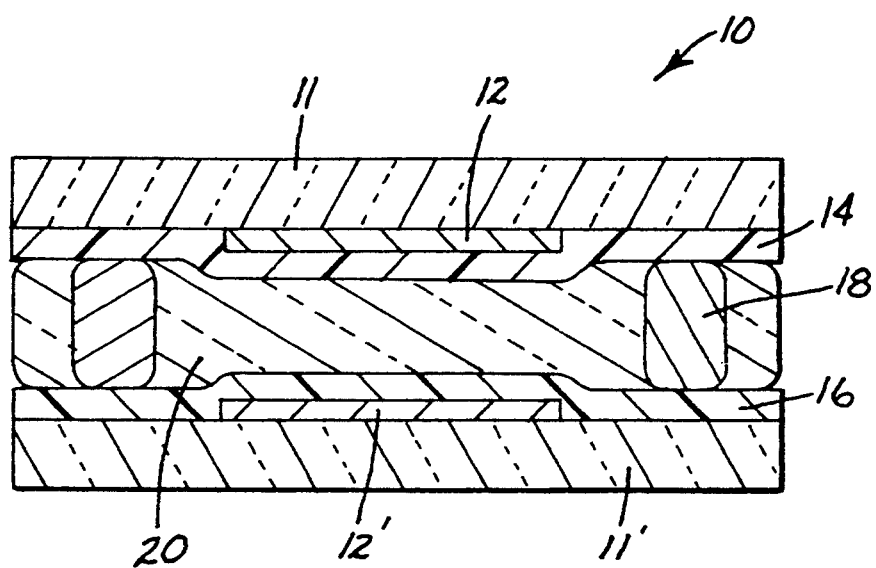

FERROELECTRIC LIQUID CRYSTAL DEVICE WITH AN ORGANOSILESQUIOXANE ALIGNMENT LAYER AND A POLYAMIDE OR POLYESTER ALIGNMENT LAYER

This is a continuation of application Ser. No. 07/916,169 filed Jul. 17, 1992, now abandoned

BACKGROUND OF THE INVENTION

This invention relates to ferroelectric, or tilted chiral smectic, liquid crystal display devices which have enhanced alignment.

In order to obtain the desired driving characteristics for optical modulating elements incorporating a bistable liquid crystal, it is necessary that the liquid crystal interposed between a pair of parallel substrates have a molecular alignment such that the two stable states are reversibly changed effectively irrespective of the state of application of the electric field. Various methods have been suggested for obtaining such molecular orientation. U.S. Pat. No. 4,561,726 (Goodby et al.) discloses alignment of ferroelectric liquid crystal display devices through the use of specific ordering substances such as polyimides, polyamides and polyesters that satisfy two criteria. They should be capable in the bulk form of being elongated at least 50 percent before fracturing and after an elongation of at least 50 percent, they should retain a length at least 20 percent more than the original length before elongation.

U.S. Pat. No. 4,367,924 (Clark et al.) discloses an electro-optical device including a chiral smectic C or H liquid crystal disposed between flat plates treated, e.g., with poly(n-methyl-3-aminopropyl-trimethoxysilane), to enforce molecular orientation parallel to the plates. The plates are spaced by a distance sufficiently small to ensure unwinding of the helix typical in a bulk of the smectic C or H material to form two stable states of the orientation field.

U.S. Pat. No. 4,563,059 (Clark et al.) discloses a liquid crystal device including a ferroelectric liquid crystal disposed between plates treated, e.g., by rubbing or oblique SiO evaporation, to enforce a particular ferroelectric molecular orientation to the plates. The devices employ, alone or in combination, non-planar boundary condition, polar boundary conditions, boundaries with multiple physical states, intrinsic spontaneous splay distortion of the polarization orientation field, combined ferroelectric and dielectric torques, and layer tilted with respect to the plates.

U.S. Pat. No. 5,109,293 (Matsunaga et al.) discloses a ferroelectric liquid crystal display element in which oblique alignment layers of SiO are inclined with respect to a substrate surface and have opposite inclination directions which are formed on opposing surfaces of a pair of substrates having transparent electrodes. A ferroelectric liquid crystal is injected into the space between the substrates only in a direction opposite to the inclination direction of the oblique alignment layers.

European Pat. Pub. No. 0 450 549 A1 (Canon) discloses a ferroelectric liquid crystal device and apparatus having a pair of substrates with orientation control films of a fluorine-containing aliphatic polyimide or a fluorine-containing alicyclic polyimide. The fluorine-containing aliphatic polyimide or alicyclic polyimide has a structural unit expressed by the following general formula:

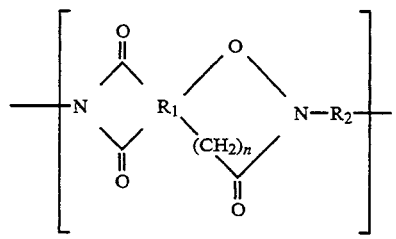

wherein $R_1$ is a tetravalent organic residue and $R_2$ is a divalent organic residue, at least one of $R_1$ and $R_2$ being a alicyclic or aliphatic organic residue containing fluorine and n is 0 or 1.

Marshal, Kenneth L., "Laser Damage Resistant Polysiloxane Polymers as Homeotropic Alignment Layers for Liquid Crystal Devices," Mol. Cryst. Liq. Cryst. Letters, Vol. (5), pp. 133–138, discloses a class of commercially available polysiloxane resins, i.e., "glass resins," which can be used to produce homeotropic aligning layers of high optical quality and laser damage resistance for liquid crystal devices with cyanobiphenyls, i.e., nematic liquid crystals, at cell spacings as large as 167 microns.

SUMMARY OF THE INVENTION

The present invention, in one aspect, relates to a bistable ferroelectric liquid crystal display device comprising a first substrate, a second substrate opposed to said first substrate, said substrates disposed to provide a non-helicoidal alignment of the ferroelectric liquid crystal material and electrodes on said substrates to define one or a plurality of pixels, said electrode bearing first substrate having an aliphatic polyamide or polyester alignment coating thereon and said electrode bearing second substrate having a organosilsesquioxane polymer coating thereon, and a ferroelectric liquid crystal mixture comprising compounds having fluorinated tail portions disposed between said substrates, with the proviso that at least one substrate is transparent.

The devices of the invention provide high quality homogeneous alignment for the mixtures comprising compounds having fluorinated tail portions.

The present invention, in another aspect, provides a method for providing an aligned ferroelectric liquid crystal display device comprising 1) coating a first substrate bearing at least one electrode with a solution of aliphatic polyamide or polyester material;
2) curing said coated first substrate;
3) rubbing said coating to align said polyamide or polyester;
4) coating a second substrate bearing at least one electrode with a solution of organosilsesquioxane polymer;
5) curing said coated second substrate;
6) placing said substrates with coated faces in opposing position and disposed to provide a non-helicoidal alignment of a ferroelectric liquid crystal material when said liquid crystal material is placed between said coated substrates;
7) securing said so disposed substrates, with the proviso that at least one of said substrates is transparent.

BRIEF DESCRIPTION OF THE DRAWING

The FIG. is a schematic sectional view of a liquid crystal device according to the present invention.

DETAILED DESCRIPTION OF THE INVENTION

Ferroelectric liquid crystal devices such as described by Clark et al. in U.S. Pat. Nos. 4,363,059 and 4,367,924, are generally bi-stable or two level devices. The two level devices are binary in nature, each picture element, or pixel, is either wholly transmitting or absorbing.

In a surface stabilized device, the liquid crystal molecules exist in either of two states in their lowest energy configuration, and both states can be accessed by the polarity of the applied field. This is accomplished by using an alignment layer on at least one of the substrates (or boundary plane) and making the spacing of the substrates of the cell less than the chiral pitch length of the liquid crystal molecule, so that the surface forces can completely unwind the molecular chiral helix.

The fixed molecular tilt angle and the boundary plane of the substrate dictate that there are two possible configurations of the molecules. In one configuration the polarization vector points towards one boundary plane, and in the other configuration, the polarization vector points towards the other boundary plane. These two states are the bi-stable states of the device. The application of an electric field across the device will switch liquid crystal molecules from one state to the other, but the molecules will always seek their lowest energy configuration. With the molecular helixes unwound, the molecular movement from one state to another is along a path described by a cone with the apex and center line parallel to the smectic layer normal. The two stable states of the molecule are at either low energy site on this cone.

When a voltage is applied across any liquid crystal device, the liquid crystal material within the device experiences electric field forces from two sources. One force, from the spontaneous polarization is proportional to P.E, and is linear with the electric field, and a second force arising from the anisotropy in the dielectric permittivity, $\Delta \epsilon E^2$ which varies quadradically with the electric field. In the above expressions, P is the polarization, $\Delta \epsilon$ is the dielectric anisotropy of the liquid crystal material, and E is the electric field developed across the device as a result of the applied voltage. In such ferroelectric devices, the P.E term is non-zero and is the dominating term, and bi-stable switching occurs.

The liquid crystal materials found most advantageous for use in the present invention are fluorinated chiral liquid crystal materials such as described, for example in U.S. Pat. No. 4,886,619 (Janulis) and U.S. Pat. No. 5,082,587 (Janulis), which are incorporated herein by reference. These materials can be used by themselves or in mixtures with other fluorinated chiral or achiral materials or hydrocarbon materials.

As can be seen in the FIG., device 10 of the present invention comprises two opposing substrates 11, 11', at least one of which is optically transparent. The inward facing surfaces of each substrate 11, 11' contains electrically conductive electrodes 12, 12' in a configuration to produce a desired pattern, electrodes 12, 12' on the substrates being transparent. Electrodes 12, 12' may be of any electrically conductive material, a common one being indium tin oxide, and may be applied by methods commonly known in the art. Substrate 11 has thereon alignment coating or layer 16 of an aliphatic polyamide or polyester material which has been rubbed and substrate 11' has thereon layer 14 of organosilsesquioxane polymer. Opposed substrates 11, 11' are disposed a small distance apart with spacers 18, said distance, along with the alignment layer, allowing for the non-helicoidal alignment of the included liquid crystal material 20. The so-produced device is then filled with liquid crystal material 20 as heretofore described, and the electrodes connected to an appropriate electrical driving source.

The aliphatic polyamide material or the polyester material serves as an alignment or ordering substance. Such polyamide materials include any of the various nylons such as, for example,

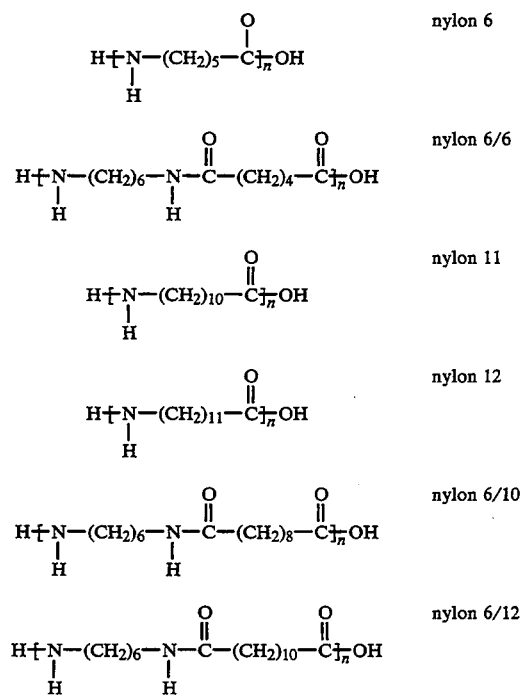

Also, nylon copolymers such as ELVAMID 8064, a terpolymer available from DuPont Company, can be used as the alignment layer. Mixtures of the polyamide materials may also be used.

Polyester materials useful in the present invention include, for example, poly(ethylene terephthalate)

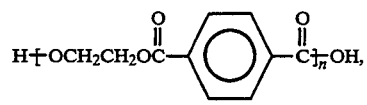

poly(butylene terephthalate) and poly(hexylene terephthalate).

The polyester or polyamide alignment layer is preferably 100 to 10,000 Å thick, more preferably 200 to 1000 Å thick, most preferably 400 to 600 Å thick. The alignment layer is preferably of uniform thickness. The layer may be deposited by conventional techniques such as spin coating, dip coating, roller coating or spraying.

The polyester or polyamide alignment layer is aligned prior to utilization in a cell by techniques well-known to those skilled in the art such as by rubbing with fabric to propagate a zone of plastic deformation and realignment of the polymer chains.

The organosilsesquioxane polymer layer of the present invention may be rubbed or non-rubbed. Typical organosilsesquioxane polymers have pendant moieties such as, for example, hydrogen atoms, alkyl groups having 1 to 4 carbon atoms, such as methyl or ethyl groups, phenyl or substituted phenyl groups such as xylyl or tolyl groups, or vinyl groups and have functional groups such as, for example, hydroxy, methoxy, ethoxy or chloro groups. Preferred organosilsesquioxane polymers are methylsilsesquioxane polymer (Resin GR-651L, available from Owens-Illinois, Inc.) and methyl- phenylsilsesquioxane polymer (Resins GR-100 and GR-150, available from Owens-Illinois, Inc.). Particularly preferred is methylsilsesquioxane polymer which can be represented by the idealized structure

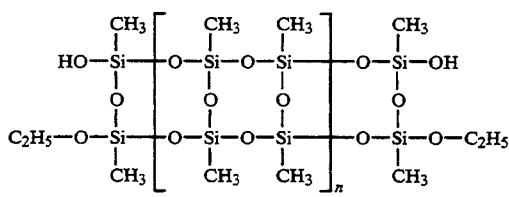

The organsilsesquioxane alignment layer is preferably 100 to 10,000 A thick, more preferably 200 to 1000 A thick, most preferably 300 to 600 A thick. The alignment layer is preferably of uniform thickness. The layer may be deposited by conventional techniques such as spin coating, dip coating, roller coating or spraying.

Additional optional layers may also be present. Such layers can include an adhesion promoting layer and/or an insulating layer coated on the electrode bearing substrate prior to application of the alignment layer. Commercially available adhesion promoting materials include, for example, bis[3-(triethoxysilyl)-propyl] amine and VM651, a $\gamma$-aminopropyltriethoxysilane available from DuPont Company. Typical insulating layers may be formed from $SiO_2$, $TiO_2$ or $Ta_2O_5$ at a thickness of about 200 to 1000 A.

The devices of the present invention can be, for example, in the form of transmissive devices where the opposed substrate is transparent, reflective devices where the opposed substrate is reflective, and devices using dyes mixed with the ferroelectric liquid crystal material which exhibit the guest-host effect, all of which are well-known to those skilled in the art.

In the following nonlimiting examples, all temperatures are in degrees Centigrade and all parts and percentages are by weight unless indicated otherwise. In each example, the electrodes of the cell were connected to an arbitrary waveform generator with variable output voltage. Optical transmission was measured by placing the cell on a rotating stage between two crossed polarizers with the polarizer/cell combination placed between a collimated light source of about 1 mW intensity and about 5 mm diameter and a silicon photodetector, the output of which was monitored on an oscilloscope. The light, obtained from a incandescent source, was filtered to confine the wavelength spectrum between 450 and 700 nm.

The 5-hexyl-2-(4-(1,1-dihydroperfluoro-2-(2-butoxyethoxy)ethoxy)phenyl)pyrimide used in the examples was prepared by fluorination and methanolysis of butoxyethoxyethyl acetate to provide methyl perfluoro-2-(butoxyethoxy)acetate which was then reduced with sodium borohydride to provide 1,1-dihydroperfluoro-2-(butoxyethoxy)ethanol. The fluoro-2-(butoxyethoxy)ethanol. The 1,1-dihydroperfluoro-2-(butoxyethoxy)ethanol was then converted to its triflate by reaction with triflic anhydride and triethylamine. The resulting triflate was then coupled with 5-hexyl-2-(4-hydroxyphenyl)pyrimidine by triflate displacement reaction. The 5-octyl-2-(4-(1,1-dihydroperfluoro-2-(2-butoxyethoxy)ethoxy)phenyl)-pyrimidine was prepared in the same manner as the 5-hexyl-2-(4-(1,1-dihydroperfluoro-2-(2-butoxyethoxy)ethoxy)phenyl)pyrimide except 5-octyl-2-(4-hydroxyphenyl)pyrimidine was substituted for the 5-hexyl-2-(4-hydroxyphenyl)pyrimidine.

The cells of each example were tested using the following procedures.

Memory Angle

The cell was driven with a voltage waveform of alternating bipolar pulses of 20 V/$\mu$m amplitude spaced 30 mS apart. The cell was aligned between crossed polarizers to obtain the best extinction during the negative half-cycle of the square wave. The cell was then aligned to obtain the best extinction during the positive half-cycle of the square wave. The angle separating the extinction points of the two memory states is the memory angle, $2\phi_m$.

$\phi_m/\phi_t$

The cell was driven with a 30 Hz square wave of 20 V/$\mu$m amplitude. The cell was aligned between crossed polarizers to obtain the best extinction during the negative half-cycle of the waveform. The cell was then aligned to obtain the best extinction during the positive half-cycle of the square wave. The angle separating extinction points of the two driven states is the tilt angle, $2\phi_t$. The ratio memory angle/tilt angle, $2\phi_m/2\phi_t$, is reported.

Latching Time

The cell was driven with a voltage waveform of alternating bipolar pulses of 20 V/$\mu$m amplitude spaced 30 mS apart. The cell was aligned between crossed polarizers to obtain the best extinction during the negative half-cycle of the waveform. Then the cell was driven with a waveform of bipolar pulses of 20 V/$\mu$m amplitude spaced 30 mS apart by a train of square wave pulses 30 mS wide and 6.7 V/$\mu$m amplitude. The minimum pulse width needed to observe two stable and saturated memory states is the latching time.

Contrast Ratio

The cell was driven with a 30 Hz square wave of 20 volt amplitude. The cell was aligned between crossed polarizers to obtain the best extinction during the negative half-cycle of the square wave. The ratio of the transmitted light intensity during the positive and negative half-cycles of the square wave was obtained. The cell was then aligned to obtain the best extinction during the positive half-cycle of the square wave and the transmitted light ratio was again determined. The average of the two ratios is reported as the contrast ratio.

Bias Contrast Ratio

The cell was driven with a waveform of alternating bipolar pulses of 20 V/$\mu$m amplitude spaced 30 mS apart by a train of square pulses 30 mS wide and 6.7 V/$\mu$m amplitude. The cell was aligned between crossed polarizers to obtain the best extinction states. Set at the first angle, the cell was driven by a waveform of bipolar pulses at 20 V/μm and spaced 3 mS apart by a train of square wave pulses 30 mS wide and 6.7 V/μm amplitude. The transmitted light intensity is determined. Then the sign of the bipolar pulse field was inverted and the transmitted intensity determined. This contrast ratio is averaged with the analogous value obtained similarly for the other angle memory state to obtain the bias contrast ratio.

EXAMPLE 1

Onto a patterned indium tin oxide coated glass substrate (2.85 cm wide, 3.5 cm long, 0.1 cm thick, cut from PD-5005 available from Donnelly Corp.) which had been ultrasonically cleaned were placed several drops of 0.52 weight percent solution of nylon 6/6 [poly(hexamethylene adipamide), No. 18,112-9, available from Aldrich Chemical Co. Inc.] in formic acid. The substrate was spun at 1200 rpm for 40 seconds and cured at 75° C. for 16 hours to provide a coating about 400 Å thick. The coated substrate was rubbed 20 strokes in one direction with a 115 gram rubbing bar (a glass rod 2.5 cm in diameter, 10 cm long) about which a velveteen fabric (#5100 Matinee, 65/35 cotton/rayon, available from J. B. Martin Co.) with the pile side out was tightly wrapped, to provide an oriented alignment layer on the substrate.

Onto an indium tin oxide coated glass substrate (2.85 cm wide, 3.5 cm long, 0.1 cm thick, PD-5005 available from Donnelly Corp.) having spacer posts 1.5 microns in height, and which had been ultrasonically cleaned were placed several drops of 1.5 weight percent solution of methylsilsesquioxane polymer (5.6% GR-651L, available from Owens-Illinois, Inc.) in butyl alcohol. The substrate was spun at 8000 rpm for 20 seconds and cured at 75° C. for 16 hours to provide a alignment coating about 200–300 Å thick.

The substrates were assembled with the alignment layers facing inward to form a cell using UV curable adhesive (Norland 61 Optical Adhesive, available from Norland Products Inc.). The cell was then filled with a liquid crystal mixture using capillary filling under vacuum-by heating to 100° C. The mixture contained the following components:

| 76.5% | 5-octyl-2-(4-(1,1-dihydroperfluoro-2-(2-butoxyethoxy)ethoxy)phenyl)-pyrimidine |
| 4.5% | 5-octyl-2-(4-(1,1-dihydroperfluoro-octyloxy)phenyl)pyrimidine |
| 4.5% | 5-nonyl-2-[4-(1,1-dihydroperfluoro-octyloxy)phenyl)pyrimidine |
| 4.5% | 5-decyl-2-(4-(1,1-dihydroperfluoro-octyloxy)phenyl)pyrimidine |
| 10.0% | (S)-4-(2-chloro-4-methylpentanoyloxy)phenyl 4-(1,1-dihydroperfluorobutoxy)benzoate. |

The transition temperatures upon cooling form the isotropic state (I) to the crystalline state (K) were I-SmA: 73° C., SmA-SmC*: 30° C. and SmC*-K: <−10° C.

The cell exhibited excellent alignment of the liquid crystal mixture as determined by observation of the liquid crystal texture with a polarizing microscope, and was evaluated for latching speed, memory angle, $\phi_m/\phi_t$, contrast ratio and bias contrast ratio. The results are as set forth in Table 1. The cell exhibited indefinitely stable switched states that remained undisrupted when the electrodes were shunted together.

EXAMPLE 2

A liquid crystal display device was prepared as in Example 1 except the liquid crystal mixture contained the following components

| 12.44% | 5-hexyl-2-(4-(1,1-dihydroperfluoro-2-(2-butoxyethoxy)ethoxy)phenyl)pyrimide |
| 20.74% | 5-octyl-2-(4-(1,1-dihydroperfluoro-hexyloxy)phenyl)pyrimidine |
| 20.74% | 5-nonyl-2-(4-(1,1-dihydroperfluoro-hexyloxy)phenyl)pyrimidine |
| 20.74% | 5-decyl-2-(4-(1,1-dihydroperfluoro-hexyloxy)phenyl)pyrimidine |
| 8.30% | 5-decyl-2-(4-(1,1-dihydroperfluoro-butoxy)phenyl)pyrimidine |
| 7.21% | (S)-4-(2-chloro-4-methylpentanoyloxy)phenyl 4-(1,1-dihydroperfluorobutoxy)benzoate |
| 3.25% | 2,3-dicyano-4-octyloxyphenyl 4-(1,1-dihydroperfluorohexyloxy)benzoate |
| 6.58% | 2,3-difluoro-4-octyloxyphenyl 4-(1,1-dihydroperfluorohexyloxy)benzoate |

The transition temperatures upon cooling form the isotropic state (I) to the crystalline state (K) were I-SmA: 78° C., SmA-SmC*: 59° C. and SmC*-K: 12° C.

The cell exhibited very good alignment of the liquid crystal mixture as determined by observation of the liquid crystal texture with a polarizing microscope, and was evaluated for latching speed, memory angle, $\phi_m/\phi_t$ contrast ratio and bias contrast ratio. The results are as set forth in Table 1.

EXAMPLE 3

A liquid crystal display device was prepared as in Example 1 except the liquid crystal mixture contained the following components

| 13.80% | 5-hexyl-2-(4-(1,1-dihydroperfluoro-2-(2-butoxyethoxy)ethoxy)phenyl)pyrimide |
| 23.00% | 5-octyl-2-(4-(1,1-dihydroperfluoro-hexyloxy)phenyl)pyrimidine |
| 23.00% | 5-nonyl-2-(4-(1,1-dihydroperfluoro-hexyloxy)phenyl)pyrimidine |
| 23.00% | 5-decyl-2-(4-(1,1-dihydroperfluoro-hexyloxy)phenyl)pyrimidine |
| 9.20% | 5-decyl-2-(4-(1,1-dihydroperfluoro-butoxy)phenyl)pyrimidine |
| 8.00% | (S)-4-(2-chloro-4-methylpentanoyloxy)phenyl 4-(1,1-dihydroperfluorobutoxy)benzoate |

The transition temperatures upon cooling form the isotropic state (I) to the crystalline state (K) were I-SmA: 81° C., SmA-SmC*: 54° C. and SmC*-K: 10° C.

The cell exhibited very good, highly uniform alignment of the liquid crystal mixture as determined by observation of the liquid crystal texture with a polarizing microscope. The device was evaluated for latching speed, memory angle, $\phi_m/\phi_t$ contrast ratio and bias contrast radio. The results are as set forth in Table 1.

EXAMPLE 4

A liquid crystal display device was prepared as in Example 3 except a polyamide terpolymer (ELVAMIDE 8064 available from DuPont Company) was substituted for the nylon 6/6.

The cell exhibited very good alignment of the liquid crystal mixture as determined by observation of the liquid crystal texture with a polarizing microscope. The device was evaluated for latching speed, memory angle, $\emptyset_m/\emptyset_t$ and contrast ratio. The results are set forth in Table 1.

Comparative Example C1

A liquid crystal display device was prepared as in Example 3 except polytrimethyl hexamethylene terephthalamide (#331, an aromatic polyamide available from Scientific Polymer Products) was substituted for the nylon 6/6, the solvent used was 60:40 m-cresol:methanol and the curing temperature was 65° C.

The cell exhibited poor quality alignment due to occasional nucleation of disordered focal conic domains in the liquid crystal mixture as determined by observation of the liquid crystal texture with a polarizing microscope. The device was evaluated for latching speed, memory angle, $\emptyset_m/\emptyset_t$ and contrast ratio. The results are set forth in Table 1.

Comparative Example C2

A liquid crystal display device was prepared as in Example 3 except ZYTEL FE-3303 (high Tg aromatic polyamide copolymer available from DuPont Company) was substituted for the nylon 6/6, and the solvent used was 60:40 m-cresol:methanol.

The cell exhibited poor quality alignment due to nucleation of disordered focal conic domains in the liquid crystal mixture as determined by observation of the liquid crystal texture with a polarizing microscope. The device was evaluated for latching speed, memory angle, $\emptyset_m\emptyset_t$ and contrast ratio. The results are as set forth in Table 1.

EXAMPLE 5

A liquid crystal display device was prepared as in Example 1 except the liquid crystal mixture contained the following components

| | |
|---|---|
| 90% | 5-octyl-2-(4-(1,1-dihydroperfluoro-2-(2-butoxyethoxy)ethoxy)phenyl)-pyrimidine |
| 10% | 5-octyl-2-(4-((S)-(2-chloro-4-methylpentanoyloxy)phenyl)pyrimidine |

The transition temperatures upon cooling form the isotropic state (I) to the crystalline state (K) were I-SmA: 76° C., SmA-SmC*: 30° C. and SmC*-K: <−10° C.

The cell exhibited very good alignment of the liquid crystal mixture as determined by observation of the liquid crystal texture with a polarizing microscope. The device was evaluated as in Example 1. The results are set forth in Table 1. The cell exhibited long-lived stable switched states that remained undisrupted when the electrodes were shunted together.

Comparative Example C3

A liquid crystal display device was prepared as in Example 5 except nylon 6/6 was substituted for the methylsilsesquioxane polymer. Both coated substrates were rubbed to generate a parallel alignment orientation.

The cell exhibited poor alignment of the liquid crystal mixture as determined by observation of the liquid crystal texture with a polarizing microscope. The device was evaluated as in Example 1. The results are as set forth in Table 1.

Comparative Example C4

A liquid crystal display device was prepared as in Example 5 except a polyimide (RN-779 available from Nissan Chemical Industries Ltd.) diluted to 50% of its original concentration with the supplied solvent was substituted for both the nylon 6/6 and methylsilsesquioxane polymer. PYRALIN VM-651, 0.05% in 95% ethanol, silane adhesion promoter (available from DuPont) was coated on the substrate prior to the application of the polyimide solution. The substrate was spun at 6000 rpm for 30 seconds and cured at 180° C. for 1 hour. Both films were rubbed to generate a parallel alignment orientation.

The cell exhibited fair alignment of the liquid crystal mixture with spots, streaks and zig-zag bands as determined by observation of the liquid crystal texture with a polarizing microscope. The device was evaluated as in Example 1. The results are set forth in Table 1.

Comparative Example C5

A liquid crystal display device was prepared as in Example 5 except a polyimide (RN-779 available from Nissan Chemical Industries Ltd.) diluted to 50% of its original concentration with the supplied solvent was substituted for the nylon 6/6. PYRALIN VM-651, 0.05% in 95% ethanol, silane adhesion promoter (available from DuPont) was coated on the substrate prior to the application of the polyimide solution. The substrate was spun at 6000 rpm for 30 seconds and cured for 1 hour at 180° C.

The cell exhibited poor, i.e., focal conic, alignment of the liquid crystal mixture as determined by observation of the aligned texture with a polarizing microscope.

Comparative Example C6

A liquid crystal display device was prepared as in Example 5 except polystyrene was substituted for the methylsilsesquioxane polymer.

The cell exhibited poor, i.e., focal conic, alignment of the liquid crystal mixture as determined by observation of the liquid crystal texture with a polarizing microscope.

Comparative Example C7

A liquid crystal display device was prepared as in Example 1 except a polyamide terpolymer (ELVAMIDE 8064 available form DuPont Company) was substituted for the nylon 6/6 and 1.5 micron posted indium-tin oxide (ITO) coated glass was used in place of the methylsilsesquioxane coated ITO glass with 1.5 micron posts, and the liquid crystal mixture contained the following components

| | |
|---|---|
| 15% | 5-hexyl-2-(4-(1,1-dihydroperfluoro-2-(2-butoxyethoxy)ethoxy)phenyl)pyrimide |
| 25% | 5-octyl-2-(4-(1,1-dihydroperfluoro-hexyloxy)phenyl)pyrimidine |
| 50% | 5-decyl-2-(4-(1,1-dihydroperfluoro-hexyloxy)phenyl)pyrimidine |
| 10% | (S)-4-(2-chloro-4-methylpentanoyloxy)phenyl 4-(1,1-dihydroperfluorobutoxy)benzoate |

The transition temperatures upon cooling from the isotropic state (I) to the crystalline state (K) were I-SmA: 81° C., SmA-SmC*: 54° C. and SmC*-K: >10° C.

The cell exhibited good to fair alignment of the liquid crystal mixture with some domain boundary walls present as determined by observation of the liquid crystal texture with a polarizing microscope. The device was evaluated for latching speed, memory angle, contrast ratio and $\emptyset_m/\emptyset_t$. The results are as set forth in Table 1.

EXAMPLE 6

A liquid crystal display device was prepared as in Example 1 except a silane adhesion promoter (PYRALIN VM-651 available from DuPont, 0.05% in 95% ethanol) was coated on the substrate prior to application of the alignment layer. Poly(ethylene terephthalate) (PET, Cat. No. 20,025-5, available from Aldrich Chemical Co., Inc.) was substituted for the nylon 6/6 and the solvent used was o-chlorophenol. The substrate was spun at 2000 rpm for 30 seconds and cured for 16 hours at 75° C.

The cell exhibited good alignment as determined by observation of the liquid crystal texture with a polarizing microscope. The device was evaluated as in Example 1. The results are set forth in Table 1.

EXAMPLE 7

A liquid crystal display device was prepared as in Example 1 except a 2:1 methyl-phenylsilsesquioxane (GR-100, available from Owens-Illinois, Inc.), 3% in butanol, was substituted for the methylsilsesquioxane. PYRALIN VM-651 silane adhesion promoter, 0.05% in 95% ethanol, was coated on the substrate prior to the application of the alignment layer. The substrate was spun at 6000 rpm for 20 seconds and cured for ½ hours at 250° C.

The cell exhibited good alignment as determined by observation of the liquid crystal texture with a polarizing microscope. The device was evaluated as in Example 1. The results are set forth in Table 1.

EXAMPLE 8

A liquid crystal display device was prepared as in Example 1 except a 1:1 methyl-phenylsilsesquioxane (GR-150, available from Owens-Illinois, Inc.), 3% in butanol, was substituted for the methylsilsesquioxane. PYRALIN VM-651 silane adhesion promoter, 0.05% in 95% ethanol, was coated on the substrate prior to the application of the alignment layer. The substrate was spun at 6000 rpm for 20 seconds and cured for ½ hours at 250° C.

The cell exhibited good alignment as determined by observation of the liquid crystal texture with a polarizing microscope. The device was evaluated as in Example 1. The results are set forth in Table 1.

Comparative Example C8

A liquid crystal display device was prepared as in Comparative Example C7 except polydimethylphenylene oxide was substituted for the ELVAMIDE and the solvent used was 1-chloroaphthalene. The substrate was spin coated at 1200 rpm for 2 minutes and cured at 70° C. for 1 hour.

The device was examined with a polarizing microscope for alignment uniformity. No alignment was observed.

Comparative Example C9

A liquid crystal display device was prepared as in Comparative Example C7 except a polyimide (RN-715 available from Nissan Chemical Industries, Ltd.) diluted to 10% of its original concentration with cyclohexanone was substituted for the ELVAMIDE. The substrate was spun at 1200 rpm for 2 minutes and cured at 80° C. for 16 hours.

The device was examined with a polarizing microscope for alignment uniformity. No alignment was observed.

EXAMPLE 9

A liquid crystal display device was prepared as in Example 1 except the liquid crystal mixture contained 20% ZLI-4237 (available from Merck, EM Industries) and 80% of the mixture of Example 3. The transition temperatures upon cooling from the isotropic state (I) to the crystalline state (K) were I=SmA: 87° C., SmA-SmC: 35° C. and SmC-K: $< -10°$ C.

The cell exhibited good alignment of the liquid crystal mixture as determined by observation of the liquid crystal texture with a polarizing microscope.

Comparative Example C10

A liquid crystal display device was prepared as in Comparative Example 4 except the polyimide was replaced by another polyimide (RN-763 available from Nissan Chemical Industries Ltd.) diluted to 50% of its original concentration with 4 parts γ-butyrolactone and 1 part butyl cellosolve, and the liquid crystal mixture was the same as in Example 9. PYRALIN VM-651, 0.05% in 95% ethanol, silane adhesion promoter (available from DuPont) was coated on the substrate prior to the application of the polyimide solution. The substrate was spun at 6000 rpm for 60 seconds and cured at 80° C. for 15 minutes and 120° C. for 1 hour.

The cell exhibited poor, i.e., focal conic, alignment of the liquid crystal mixture as determined by observation of the aligned texture with a polarizing microscope.

Comparative Example C11

A liquid crystal display device was prepared as in Comparative Example 10 and the liquid crystal mixture was the same as in Example 3.

The cell exhibited poor, i.e., focal conic, alignment of the liquid crystal mixture as determined by observation of the aligned texture with a polarizing microscope.

Comparative Example C12

A liquid crystal display device was prepared as in Example 3 except a polyimide (RN-763, available from Nissan Chemical Industries Ltd.) diluted to 50% of its original concentration with 4 parts γ-butyrolactone and 1 part butyl cellosolve was substituted for the nylon 6/6. PYRALIN VM-651, 0.05% in 95% ethanol, silane adhesion promoter (available from DuPont) was coated on the substrate prior to the application of the polyimide solution. The substrate was spun at 6000 rpm for 60 seconds and cured at 80° C. for 15 minutes and 120° C. for 1 hour.

The cell exhibited poor, i.e., focal conic, alignment of the liquid crystal mixture as determined by observation of the aligned texture with a polarizing microscope.

TABLE 1

| Example | Memory Angle ($2\phi_m$) | $2\phi_m/2\phi_t$ | Latching Time (μS) | Contrast Ratio | Bias Contrast Ratio |
|---|---|---|---|---|---|
| 1 | 38 | 0.86 | 31 | 2200 | 38 |
| 2 | 28 | 0.56 | 33 | 380 | 10 |
| 3 | 35 | 0.56 | 80 | 640 | 1.7 |
| 4 | 36 | 0.58 | 80 | 300 | — |
| C1 | 33 | 0.53 | 80 | 300 | — |
| C2 | 30 | 0.48 | 300 | 70 | — |
| 5 | 34 | 0.92 | 9 | — | 140 |
| C3 | 30 | 0.75 | 10 | 740 | 35 |
| C4 | 30 | 0.75 | 12 | 560 | 55 |

TABLE 1-continued

| Example | Memory Angle (2φm) | 2φm/2φt | Latching Time (μS) | Contrast Ratio | Bias Contrast Ratio |
|---|---|---|---|---|---|
| C7 | 37 | 0.60 | 60 | 100 | — |
| 6 | 39 | 0.87 | 36 | 1300 | 21 |
| 7 | 37 | 0.84 | 28 | 573 | 33 |
| 8 | 37 | 0.82 | 24 | 475 | 23 |

Various modifications and alterations of this invention will become apparent to those skilled in the art without departing from the scope and spirit of this invention and it should be understood that this invention is not to be unduly limited to the illustrative embodiments set forth herein.

What is claimed is:

1. A bistable ferroelectric liquid crystal display device comprising a first substrate, a second substrate opposed to said first substrate, said substrates disposed to provide a non-helicoidal alignment of the ferroelectric liquid crystal material and electrodes on said substrates to define one or a plurality of pixels, said electrode bearing first substrate having an aliphatic polyamide or polyester alignment coating thereon and said electrode bearing second substrate having an organosilsesquioxane polymer coating thereon, and a ferroelectric liquid crystal mixture comprising compounds having fluorinated tail portions comprising multiple-$CF_2$- groups disposed between said substrates with the proviso that at least one of said substrates is transparent.

2. The device of claim 1 wherein said polyamide coating is nylon.

3. The device of claim 2 wherein said nylon coating is nylon 6, nylon 6/6, nylon 11, nylon 12, nylon 6/10 or nylon 6/12, copolymers thereof or mixtures thereof.

4. The device of claim 1 wherein said polyester coating is poly(ethylene terephthalate), poly(butylene terephthalate) or poly(hexylene terephthalate).

5. The device of claim 1 wherein said organosilsesquioxane polymers have pendant moieties selected from hydrogen atoms, alkyl groups having 1 to 4 carbon atoms, phenyl groups, substituted phenyl groups or vinyl groups and functional groups selected from hydroxy, methoxy, ethoxy or chloro groups or mixtures thereof.

6. The device of claim 1 wherein both said first substrate and said second substrate are transparent.

7. A method for providing an aligned ferroelectric liquid crystal display device comprising
   1) coating a first substrate bearing at least one electrode with a solution of aliphatic polyamide material or polyester material;
   2) curing said coated first substrate;
   3) rubbing said coating to align said polyamide or polyester;
   4) coating a second substrate bearing at least one electrode with a solution of organosilsesquioxane polymer;
   5) curing said coated second substrate;
   6) placing said substrates with coated faces in opposing position and disposed to provide a non-helicoidal alignment of a ferroelectric liquid crystal material when said liquid crystal material is placed between said coated substrates;
   7) securing said so disposed substrates,
with the proviso that at least one of said substrates is transparent;
   8) disposing between said substrates a ferroelectric liquid crystal mixture comprising fluorinated tail potions comprising multiple $CF_2$ groups.

8. The method of claim 7 wherein said polyamide coating is nylon.

9. The method of claim 8 wherein said nylon coating is nylon 6, nylon 6/6, nylon 11, nylon 12, nylon 6/10 or nylon 6/12, copolymers thereof or mixtures thereof.

10. The method of claim 7 wherein said polyester coating is poly(ethylene terephthalate), poly(butylene terephthalate) or poly(hexylene terephthalate).

11. The method of claim 7 wherein said organosilsesquioxane polymers have pendant moieties selected from hydrogen atoms, alkyl groups having 1 to 4 carbon atoms, phenyl groups, substituted phenyl groups or vinyl groups and functional groups selected from hydroxy, methoxy, ethoxy or chloro groups or mixtures thereof.

12. The method of claim 7 wherein both said first substrate and said second substrate are transparent.

* * * * *

UNITED STATES PATENT AND TRADEMARK OFFICE
CERTIFICATE OF CORRECTION

PATENT NO. : 5,377,033
DATED : December 27, 1994
INVENTOR(S) : Marc D. Radcliffe It is certified that error appears in the above-indentified patent and that said Letters Patent is hereby corrected as shown below:

| | |
|---|---|
| Col. 3, line 42 | "P.E," should read -- $\vec{P} \cdot \vec{E},$ -- |
| Col. 3, line 49 | "P.E" should read -- $\vec{P} \cdot \vec{E}$ -- |
| Col. 5, line 68 to Col. 6, line 1 | delete "The fluoro-2-(butoxyethoxy)ethanol." |
| Col. 7, line 1 | "3" should read -- 30 -- |
| Col. 7, lines 43-44 | "vacuum-by" should read -- vacuum by -- |
| Col. 9, line 9 | "m-cresol:me-" should read -- $\underline{m}$-cresol:me- -- |
| Col. 9, line 24 | "m-cresol:methanol." shouldr ead -- $\underline{m}$-cresol:methanol. -- |
| Col. 9, line 30 | "$\phi_m \phi_t$ " should read -- $\phi_m / \phi_t$ -- |
| Col. 13, line 29 | "multiple-CF$_2$-" should read -- multiple -CF$_2$- -- |

Signed and Sealed this

Thirteenth Day of June, 1995

Attest:

BRUCE LEHMAN

*Attesting Officer*   *Commissioner of Patents and Trademarks*